DRIVE MECHANISM FOR MAGNETIC RECORDINC DECK

Filed Dec. 8, 1958

INVENTORS:
GEORG FISCHER,
HANS-GEORG LANGE &
WERNER DINSE

BY [signature]

PATENT AGENT 2,975,242

DRIVE MECHANISM FOR MAGNETIC RECORDING DECK

Georg Fischer and Hans-Georg Lange, Wedel, Holstein, and Werner Dinse, Hamburg-Blankenese, Germany, assignors to Telefunken G.m.b.H., Berlin, Germany Filed Dec. 8, 1958, Ser. No. 778,973

Claims priority, application Germany Dec. 18, 1957

5 Claims. (Cl. 179—100.2)

Figures 1, 2:
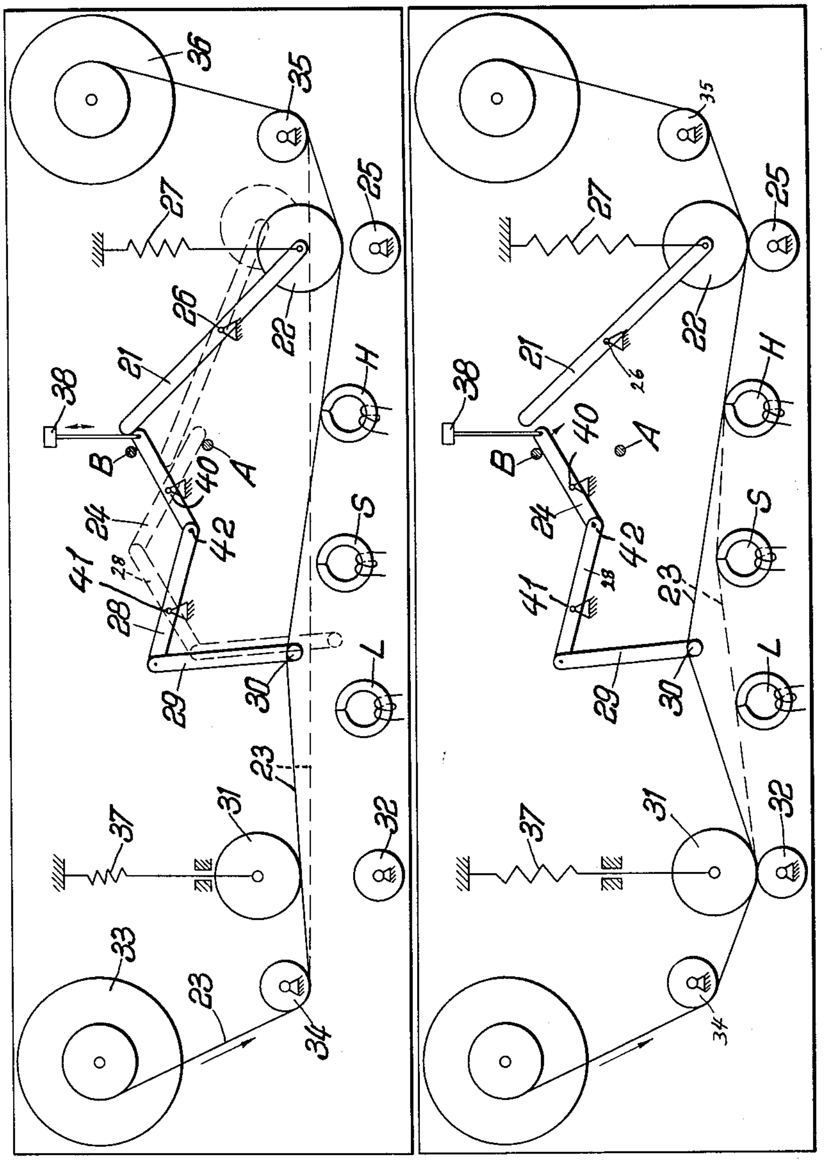

The present invention relates to a drive mechanism for a magnetic recording deck in which a magnetic carrier, such as a magnetic wire or tape, is lifted from magnetic heads and from a drive capstan when a pressure roller is displaced from the drive capstan, while the carrier engages the heads when held against the drive capstan by means of the pressure roller, as shown, for example in German Patent No. 847,356.

In known magnetic tape drive mechanisms, the lever carrying the pressure roller, which may be of rubber or rubber-lined, has two operative positions. These positions are usually obtained by depressing the operating buttons "record," "reproduce," and "stop." If buttons or keys "rewind," "forward," or "reverse" are depressed, the winding motors coupled to the reel spindles will be respectively energized and the magnetic tape is wound from one of the reels to the other without engaging the magnetic heads. No scanning of the magnetic tape by the heads can be carried out during these operations.

It is an object of the present invention to provide a drive mechanism for magnetic carriers, such as wire and tape recorders or reproducers, wherein the magnetic carrier can engage the reproducing head without being engaged with the drive capstan, so that the recording on the magnetic carrier can be reproduced during editing the same. During such operation, the operator turns the reels either manually or by means of special drives operative at low speed, i.e., motors for running the magnetic tape forward or reverse, until the point to be edited is found by listening.

It is another object of the present invention to provide a lever supporting the pressure roller in such a manner that, in addition to the operative positions in which the magnetic tape is applied to or removed from the magnetic heads and, simultaneously, from the drive capstan, this lever can be brought into an intermediate position in which the magnetic tape is held at least against the reproducing head, while still disengaged from the drive capstan.

The possibility of bringing the lever carrying the pressure roller to an intermediate position has the advantage that, prior to the selection of the operative conditions "record" or "reproduce," these positions can be approached by first adjusting the lever to the intermediate position from which this lever can be advanced by means of an actuating member to a position almost engaging the capstan so that, upon actuation of the operating key "record" or "reproduce," the pressure roller will have to be moved only through a very short distance. As a result of this, a very quick start of the magnetic tape is obtained, because the electromagnet displacing the pressure roller lever has to act through only the last part of the motion of the lever.

Still further objects and the entire scope of applicability of the present invention will become apparent from the detailed description given hereinafter; it should be understood, however, that the detailed description and specific example, while indicating the preferred embodiment of the invention, is given by way of illustration only, since various changes and modifications within the spirit and scope of the invention will become apparent to those skilled in the art from this detailed description.

Figures 1 and 2 show schematically plan views of an apparatus according to the invention in several operative positions.

According to Figure 1, a lever 21 carrying a pressure roller 22 assumes the position shown in dotted lines when the apparatus is adjusted to "stop" or "rewind." A magnetic tape 23, indicated in this position by a dashed line, does not engage magnetic heads, i.e., an erasing head L, a recording head S and a reproducing head H, nor a drive capstan 25, i.e., the tape 23 is guided from the left reel 33 to the right reel 36 solely by guide rollers 34 and 35. The reels 33 and 36 are driven during winding by separate drive motors (not shown), or are coupled to the drive motor of the drive capstan 22 via belts or the like (not shown). If a lever 24, which can be displaced by means of a handle 38 accessible on the outside of the recording or reproducing apparatus, is turned from its rest or inoperative position indicated in dotted lines and limited by an abutment A to the position indicated in full lines and limited by abutment B about a stationary pivot 40, the lever 21 carrying the pressure roller 22 is turned clockwise about its pivot 26 overcoming the force of a spring 27. The lever 21 is thereby brought to an intermediate position, shown in solid lines, in which the magnetic tape engages at least the reproducing head H without being advanced by the drive capstan 25 which is not engaged. Thus, in this intermediate position, the magnetic tape can be freely maneuvered during editing, so that the locating of the edit point is facilitated. It is irrelevant whether or not the magnetic tape engages only the reproducing head H or also the erasing head L and the recording head S, because the latter are not energized when the magnetic tape 23 is not driven by the capstan 25.

The operation of the apparatus according to the invention can be simplified by providing linkage means, i.e., another pair of levers 28, 29, adapted to be displaced during actuation of the lever 21 carrying the pressure roller 22, whereby the magnetic tape 23 is lifted from the erasing head L and the recording head S by means of the lever 29. For this purpose, one end of the lever 28, which is pivoted at 41, is hingedly connected to one end of the lever 24 at 42, and the lever 29 is displaceable in a direction which is substantially perpendicular to the direction of the magnetic tape 23. The lever 29 will be displaced when the lever 24 is actuated by means of the handle 38 via the lever pair 28, 29, whereby a pin 30 mounted on the free end of the lever 29 engages or grips the magnetic tape 23 and lifts it from the erasing head L and the recording head S. The magnetic heads are arranged in such a manner that, during the lifting action just mentioned, the magnetic tape 23 remains only in contact with the reproducing head H.

If the lever 24 is in the position shown in full lines in Figure 1, and if the apparatus is switched to "record," the lever 21 carrying the pressure roller 22 is turned clockwise into a drive position, for example, by means of an electromagnet, to such an extent that the pressure roller 22 deflects and holds the magnetic tape 23 against the drive capstan 25, whereby the spring 27 is further stretched. An additional pressure roller 31 is provided in front of the magnetic heads with reference to the direction of travel of the magnetic tape, said pressure roller, likewise, being adapted to be displaced, overcoming the force of a spring 37 when actuated by means of a magnet (not shown), whereby this pressure roller 31 holds the magnetic tape 23 against a damping roller 32 which is mounted to be freely driven by the tape together with the pressure roller 31.

In the drive position shown in Figure 2 in solid lines, the magnetic tape 23, which is now driven by the drive capstan 25, is likewise lifted from the erasing head L and the recording head S and only held against the reproducing head H. As a result of this, when a new recording is to be added, starting at a certain point of the already recorded tape 23, the intelligence previously recorded thereon can be reproduced and the new recording can start when the desired point on the tape is reached without switching transients by turning the lever 24 from its position limited by the abutment B clockwise to the position limited by the abutment A (see Figure 1), whereby the magnetic tape 23 is released by the pin 30, so that this tape contacts the erasing head L and the recording head S.

If the location of the magnetic tape 23 in the intermediate position were to be determined only by the position of the pressure roller lever 22, it would be difficult to arrange the magnetic heads in such a manner that, in this intermediate position, a sufficiently large distance would be present between the magnetic tape 23 and the erasing head L and the recording head S. In such case, it would be necessary to disconnect electrically the erasing head L and the recording head S, until the edit point for the new recording is found on the magnetic head. This would be disadvantageous in view of the necessity to provide additional operating means and for the reason that the switching transients would be recorded on the tape as audible clicks.

We claim:

1. In a magnetic recording and reproducing apparatus, the combination which comprises: a deck carrying a reproducing head, a recording head and an erasing head, all lying substantially adjacent to the path of a magnetic carrier; a power driven capstan for driving the magnetic carrier past said heads; idler means for normally directing the magnetic carrier along a path out of contact with said heads and said capstan; and pressure means cooperating with the magnetic carrier and being positionable in an inoperative position wherein the magnetic carrier is out of contact with said heads and said capstan, at least one operative drive position wherein the magnetic carrier is in contact with at least said reproducing head and said capstan, and an intermediate position wherein the magnetic carrier is in contact at least with said reproducing head but out of contact with said capstan.

2. The combination defined in claim 1 wherein said pressure means comprise a pressure roller and a roller supporting means movably arranged on said deck, said roller supporting means, when said pressure means are in said operative drive position thereof, being in a position in which said pressure roller presses the magnetic carrier into contact with said capstan, said roller supporting means being actuatable by a separate control means.

3. The combination defined in claim 1 wherein said pressure means are positionable in two drive positions in one of which the magnetic carrier is in contact only with said reproducing head and said capstan and in the other of which the magnetic carrier is in contact with all of said heads and said capstan.

4. The combination defined in claim 1 wherein said pressure means include a pressure roller, roller supporting means movably arranged on said deck and carrying said pressure roller, and additional means arranged between said recording and erasing heads and movable transversely of the direction of travel of the magnetic carrier for deflecting the latter out of contact with said recording and erasing heads.

5. In magnetic recording and reproducing apparatus including a deck carrying a reproducing head, a recording head and an erasing head, all lying substantially adjacent to the path of a magnetic carrier, a carrier drive mechanism on the deck and comprising a power driven capstan for pulling the carrier past the heads, idler means for normally directing the carrier along a path out of contact with the heads and capstan; pressure roller means cooperating with the capstan; roller supporting means on the deck and positionable in an inoperative position, in an intermediate position, wherein the roller means deflect the carrier adjacent to but not touching the capstan, and in a drive position, wherein the roller means deflect and hold the carrier against the drive capstan to advance the carrier, the roller means deflecting the carrier into contact with the reproducing head in the intermediate position and in the drive position of the supporting means, said carrier normally contacting said recording and erasing heads when the roller supporting means is in the drive position, and separate control means comprising linkage means adjacent the recording and erasing heads and movable transversely of the direction of travel of the carrier to deflect the latter out of contact with said recording and erasing heads, said separate control means, when actuated to deflect the carrier, moving said roller supporting means into said intermediate position.

References Cited in the file of this patent

UNITED STATES PATENTS

| | | |
|---|---|---|
| 2,535,498 | Kornei | Dec. 26, 1950 |
| 2,560,254 | Schickel | July 10, 1951 |
| 2,604,321 | Williams | July 22, 1952 |
| 2,813,686 | Schroter | Nov. 19, 1957 |

FOREIGN PATENTS

| | | |
|---|---|---|
| 148,052 | Australia | Sept. 4, 1952 |